United States Patent
Pawar et al.

(10) Patent No.: US 10,001,964 B2
(45) Date of Patent: Jun. 19, 2018

(54) SYSTEMS, METHODS, AND DEVICES FOR HANDLING WI-FI AND BLUETOOTH AUDIO

(71) Applicant: Intel Corporation, Santa Clara, CA (US)

(72) Inventors: Sagar Pawar, Aurangabad (IN); Prakash Pillai, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 151 days.

(21) Appl. No.: 14/733,169

(22) Filed: Jun. 8, 2015

(65) Prior Publication Data

US 2016/0359766 A1    Dec. 8, 2016

(51) Int. Cl.

| | |
|---|---|
| *H04L 12/911* | (2013.01) |
| *G06F 3/16* | (2006.01) |
| *H04L 1/16* | (2006.01) |
| *H04R 27/00* | (2006.01) |
| *H04W 84/12* | (2009.01) |
| *H04W 84/18* | (2009.01) |

(52) U.S. Cl.
CPC ............ *G06F 3/165* (2013.01); *H04L 1/16* (2013.01); *H04R 27/00* (2013.01); *H04R 2420/07* (2013.01); *H04W 84/12* (2013.01); *H04W 84/18* (2013.01)

(58) Field of Classification Search
None
See application file for complete search history.

(56) References Cited

U.S. PATENT DOCUMENTS

| | | | | |
|---|---|---|---|---|
| 2004/0242159 | A1* | 12/2004 | Calderon | H04W 16/14 455/63.3 |
| 2005/0058131 | A1* | 3/2005 | Samuels | H04L 12/24 370/389 |
| 2014/0269309 | A1* | 9/2014 | Lee | H04W 52/0235 370/235 |

\* cited by examiner

*Primary Examiner* — Kouroush Mohebbi
(74) *Attorney, Agent, or Firm* — Eversheds Sutherland (US) LLP

(57) ABSTRACT

Methods, devices and systems for handling Wi-Fi or Bluetooth signals in a wireless network are disclosed. Example embodiments include a method including the operations of receiving, by a speaker system comprising at least one processor and one or more output speakers, one or more encoded data streams over a wireless connection, decoding the one or more data streams and outputting the one or more decoded data streams through the one or more output speakers, and pausing outputting of the one or more decoded data streams upon determining a halting event.

18 Claims, 8 Drawing Sheets

SYSTEMS, METHODS, AND DEVICES FOR HANDLING WI-FI AND BLUETOOTH AUDIO

TECHNICAL FIELD

Example and non-limiting embodiments disclosed herein relate generally to wireless communication systems and, more specifically, relate to wireless communication systems for handling Wi-Fi and Bluetooth signals in a wireless environment.

BACKGROUND

Communication systems typically operate in accordance with one or more communication standards. Wireless communication systems may operate in accordance with one or more standards including, but not limited to, Institute of Electrical and Electronics Engineers (IEEE) 802.11, Wi-Fi Direct, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), time division multiple access (TDMA) systems, frequency division multiple access (FDMA) systems, 3GPP Long Term Evolution (LTE) systems, and orthogonal frequency division multiple access (OFDMA) systems.

Some advanced devices include multiple radios for transmitting/receiving using different Radio Access Technologies (RATs). Examples of RATs include, e.g., Universal Mobile Telecommunications System (UMTS), Global System for Mobile Communications (GSM), cdma2000, WiMAX, WLAN (e.g., Wi-Fi), Bluetooth, LTE, and the like.

BRIEF DESCRIPTION OF THE DRAWINGS

The embodiments, features, and aspects of the present disclosure will become more apparent from the detailed description set forth below when taken in conjunction with the drawings in which like reference characters identify correspondingly throughout and wherein.

DETAILED DESCRIPTION

Figure 1:
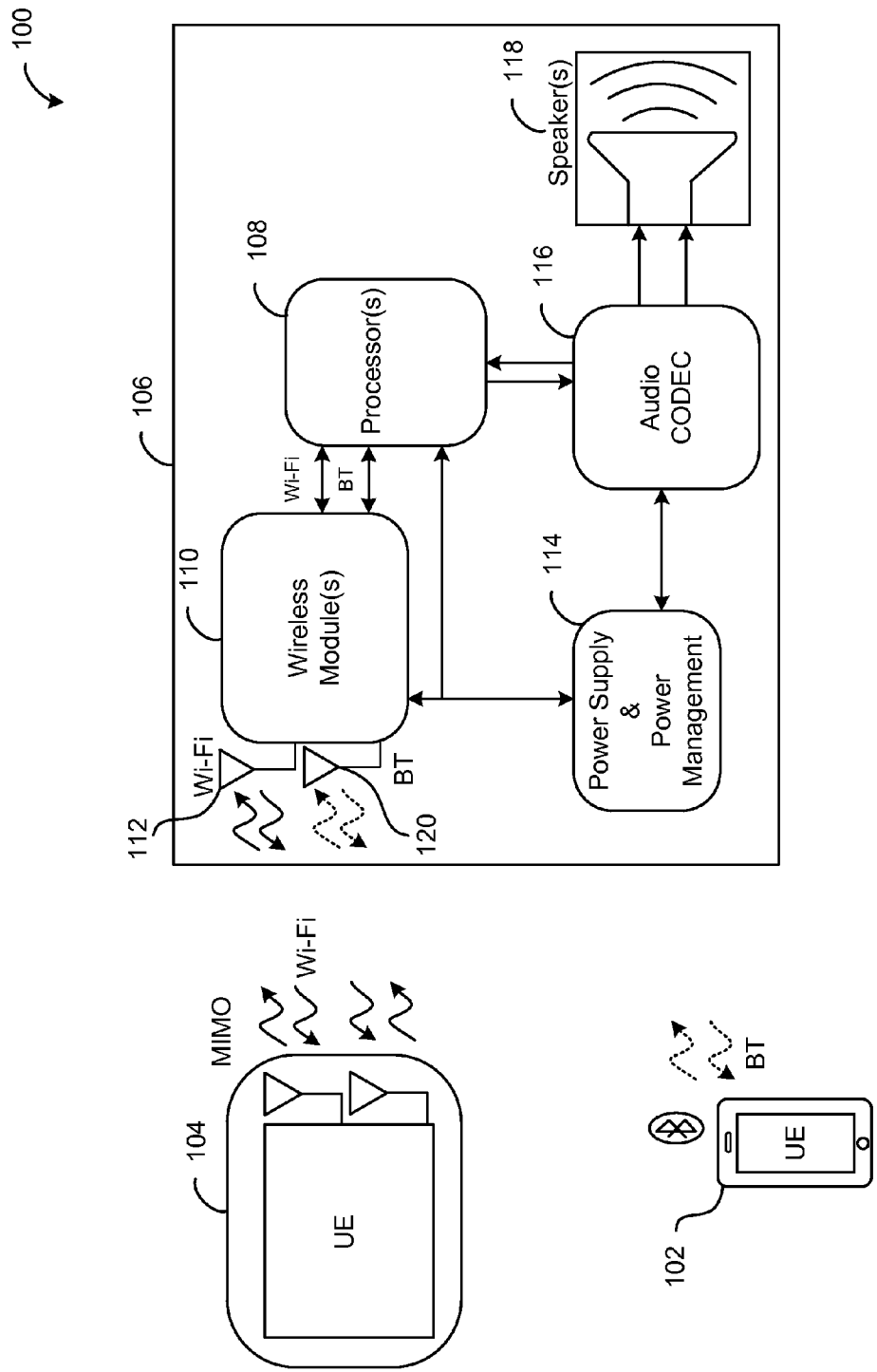
FIG. 1 illustrates system architecture of an example wireless speaker system, according to one or more example embodiments.

The following description with reference to the accompanying drawings is provided to assist in a comprehensive understanding of embodiments of the disclosure as defined by the claims and their equivalents. It includes various specific details to assist in that understanding but these are to be regarded as merely examples. Accordingly, those of ordinary skill in the art will recognize that various changes and modifications of the embodiments described herein can be made without departing from the scope and spirit of the disclosure. In addition, descriptions of well-known functions and constructions may be omitted for clarity and conciseness.

Currently there is no mechanism to automatically pause synchronized audio streaming over Wi-Fi, such as IEEE1588 (PTP), 802.1AS, when a Bluetooth device or another host requests to play an audio stream over Bluetooth. Example embodiments disclosed address multiple host (Wi-Fi+BT) conflicts and enable a receiver node communication to a primary node, such as Wi-Fi, to stall, pause, or halt audio stream. If a primary host, for example Wi-Fi, is transmitting an audio stream to receiver node, such as wireless audio speakers, and secondary host, such as a Bluetooth device, comes in the range and a request is generated to play audio stream over Bluetooth instead of Wi-Fi, the receiver node, such as the wireless audio speakers, may stall, pause, or halt audio streaming over Wi-Fi and inform the primary host, over Wi-Fi, with a timestamp and play the audio stream over Bluetooth.

One example embodiment is a method including the operations of informing a primary host, such as Wi-Fi, about a secondary host request and halting an audio stream from primary host (Wi-Fi) when a secondary host, such as Bluetooth, pushes audio stream. The method may also include the operation of resuming the audio stream from last time stamp at the primary host once a secondary host request is served by a receiver node, such as wireless audio speakers.

According to one example embodiment, when wireless audio speakers, for example a receiver node, is capable of Wi-Fi and Bluetooth reception, example methods and systems may always use Wi-Fi as primary mechanism to talk to primary host, such as Wi-Fi that may be IEEE1588, 802.1AS compliant. But when a secondary host comes in range of a receiver node and pairing is done in parallel to a Wi-Fi connection, and if a secondary host, such as Bluetooth, requests to play an audio stream it may be necessary for the receiver node to inform the primary host to stop audio stream transmission until requested and play the audio stream over Bluetooth. Currently there is no feedback mechanism between a receiver node and a primary host, such as Wi-Fi, when a secondary host, such as Bluetooth, requests to play audio stream over Bluetooth instead of Wi-Fi. Example embodiments disclosed identify requests from a secondary host, such as Bluetooth, while it continues to receive audio stream over Wi-Fi from a primary host and processes the received audio stream from Wi-Fi, notes the timestamp, and then sends an RAS packet back to primary host (Wi-Fi) to stall, pause, halt transmission and then processes and plays Bluetooth audio stream received from a secondary host.

Turning now to FIG. 1, FIG. 1 is high level architecture of a wireless speaker system 100, according to one or more example embodiments. The system 100 may include one or more user equipments 102, 104, for example a cell phone device, that may be able to communicate with a speaker system 106 over a wireless network, such as a Wi-Fi network. User equipment 102, 104 may be equipped with a Wi-Fi module or a Bluetooth module, or both, such that the equipment may receive and transmit both Wi-Fi and Bluetooth signals with one or more additional devices, including speaker system 106. In one example embodiment, the "primary host" 104 may be IEEE1588, 802.1AS compliant, the secondary host 102, such as a Bluetooth device 102 with a wireless audio receiver or receiver node. As depicted in FIG. 1 on the receiver node, for example speaker system 106, the primary medium of communication may be Wi-Fi, such as IEEE1588, 802.1AS, and secondary medium of communication may be Bluetooth. When primary host (Wi-Fi) 104 is transmitting audio streaming to a receiver node, and a secondary host (Bluetooth) 102 sends a pairing request, pairing request may be processed by a Wi-Fi+BT module 110, establishing communication with the receiver node on Bluetooth. Speaker system 106 may include one or more antennas 112 to send and receive one or more Wi-Fi or Bluetooth signals, one or more audio codecs 116, a power supply and management module 114, and a processor 108. Processor 108 may be configured to carry out any of the methods described herein. Signals from the audio codec 116 may be sent to one or more output speakers 118 for output to a user.

Figure 2:
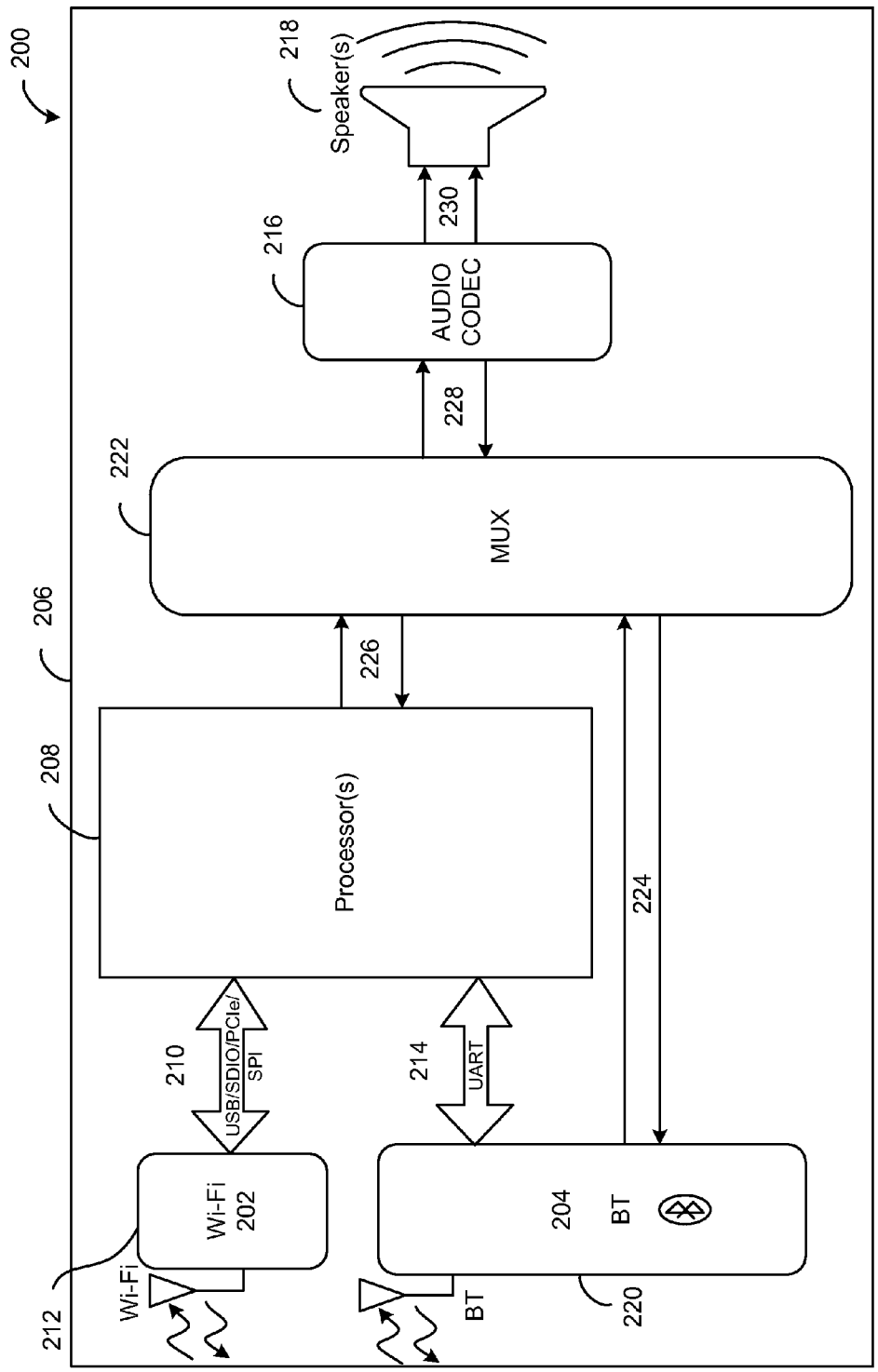
FIG. 2 illustrates in detail an example system architecture of an example wireless speaker system, according to one or more example embodiments.

FIG. 2 illustrates a detailed block diagram of a speaker system including a wireless audio receiver 206 where a secondary host 220 (Bluetooth) may establish a communication with a receiver node, for example a wireless audio receiver 206. Processor 208 present on the wireless audio receiver 206 may load the BT driver over UART, for example. Secondary host 220 (Bluetooth) may send audio stream playback request to a wireless audio receiver, and Bluetooth receiver 220 would send an interrupt to the processor 208 to read the information sent over UART. Meanwhile wireless audio receiver may already be streaming audio over Wi-Fi (IEEE1588, 802.1AS). Once the processor 208 on wireless audio receiver 206 receives the audio stream playback request over UART from Bluetooth, it may send interrupt back to Wi-Fi controller 212 with RAS (Reliability, Accessibility, Serviceability) packet sent back to primary host (Wi-Fi) to stall, pause, or halt the transmission of audio stream with the help of a timestamp received from the receiver node, wireless audio receiver 206. Wireless audio receiver 206 may also include one or more processors 208, one or more multiplexers 222, one or more audio codecs 216, and one or more output speakers 218.

Figure 3:
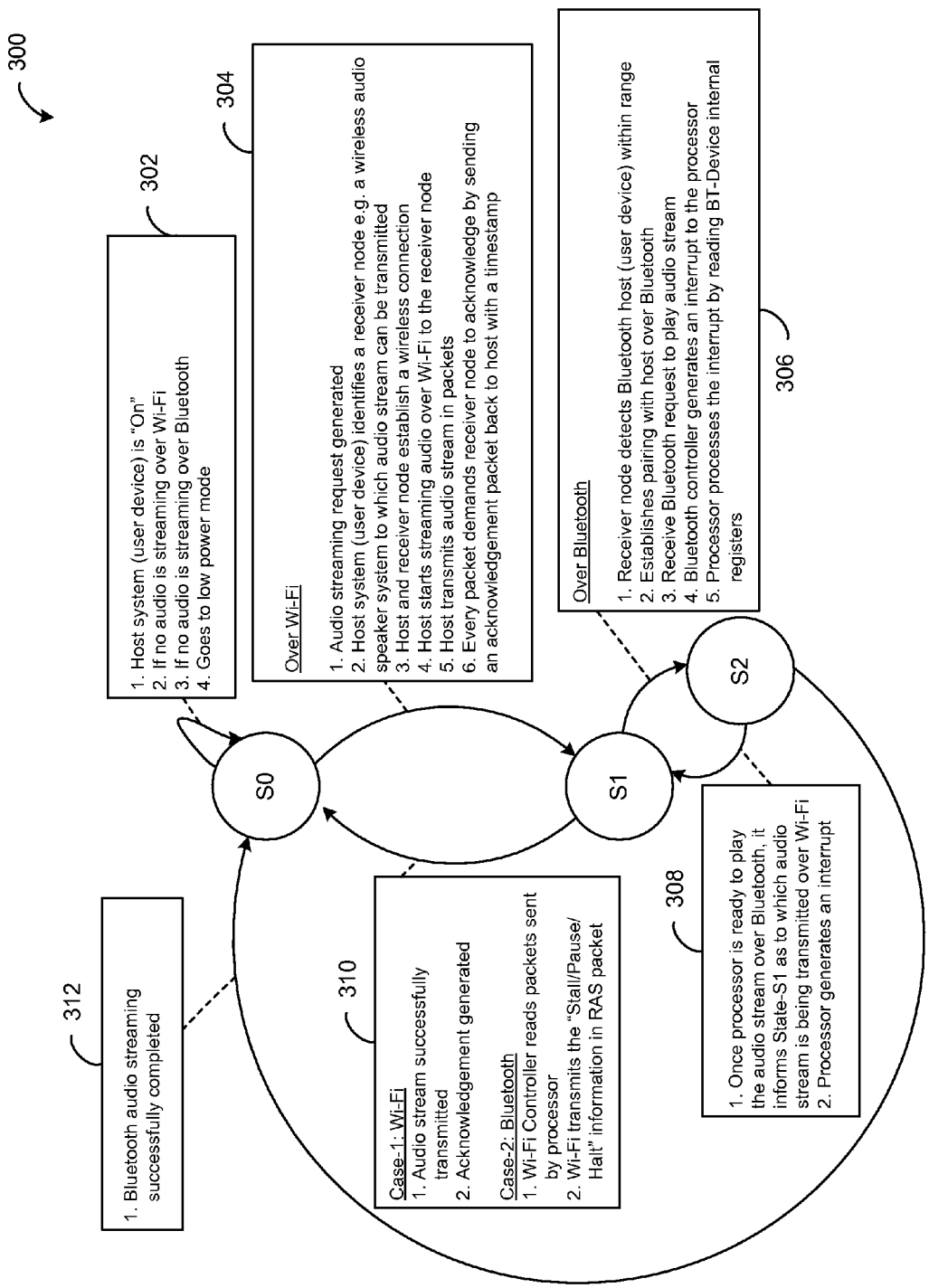
FIG. 3 illustrates an example state methodology for processing multi-host environment on receiver node, according to one or more example embodiments.

Turning now to FIG. 3, FIG. 3 illustrates a state diagram 300 illustrating various operations involved in handling Wi-Fi and Bluetooth signals, according to one or more example embodiments. More specifically, the figure illustrates primary host versus secondary host messaging and response from wireless audio speakers, for example a receiver node. At block 302, on the receiver node, for example wireless audio speaker sub-system, the primary medium of communication may be Wi-Fi (IEEE1588, 802.1AS) and secondary medium of communication may be Bluetooth. In block 304, when primary host (Wi-Fi) is transmitting audio streaming to receiver node and at block 306 secondary host (Bluetooth) sends a pairing request, pairing request may be processed by Bluetooth controller thus establishing a communication with receiver node on Bluetooth. As depicted in FIG. 2, detailed block diagram of the wireless audio receiver 206, secondary host (Bluetooth) 204 establishes communication with receiver node, such as wireless audio speaker. Processor 208 present on the wireless audio receiver would load the BT driver over UART. At block 308, secondary host (Bluetooth) 204 may send audio stream playback request to the wireless audio receiver, when Bluetooth receiver would send an interrupt to the processor 208 to read the information sent over UART meanwhile wireless audio receiver is already streaming audio over Wi-Fi (IEEE1588, 802.1AS). Once processor on wireless audio receiver receives the audio stream playback request over UART from Bluetooth, at block 310 it sends interrupt back to Wi-Fi controller with RAS (Reliability, Accessibility, Serviceability) packet sent back to primary host (Wi-Fi) which is already transmitting and in response stalls, pauses, or halts the transmission of audio stream with the help of timestamp received from the receiver node (wireless audio speakers).

Figure 4:
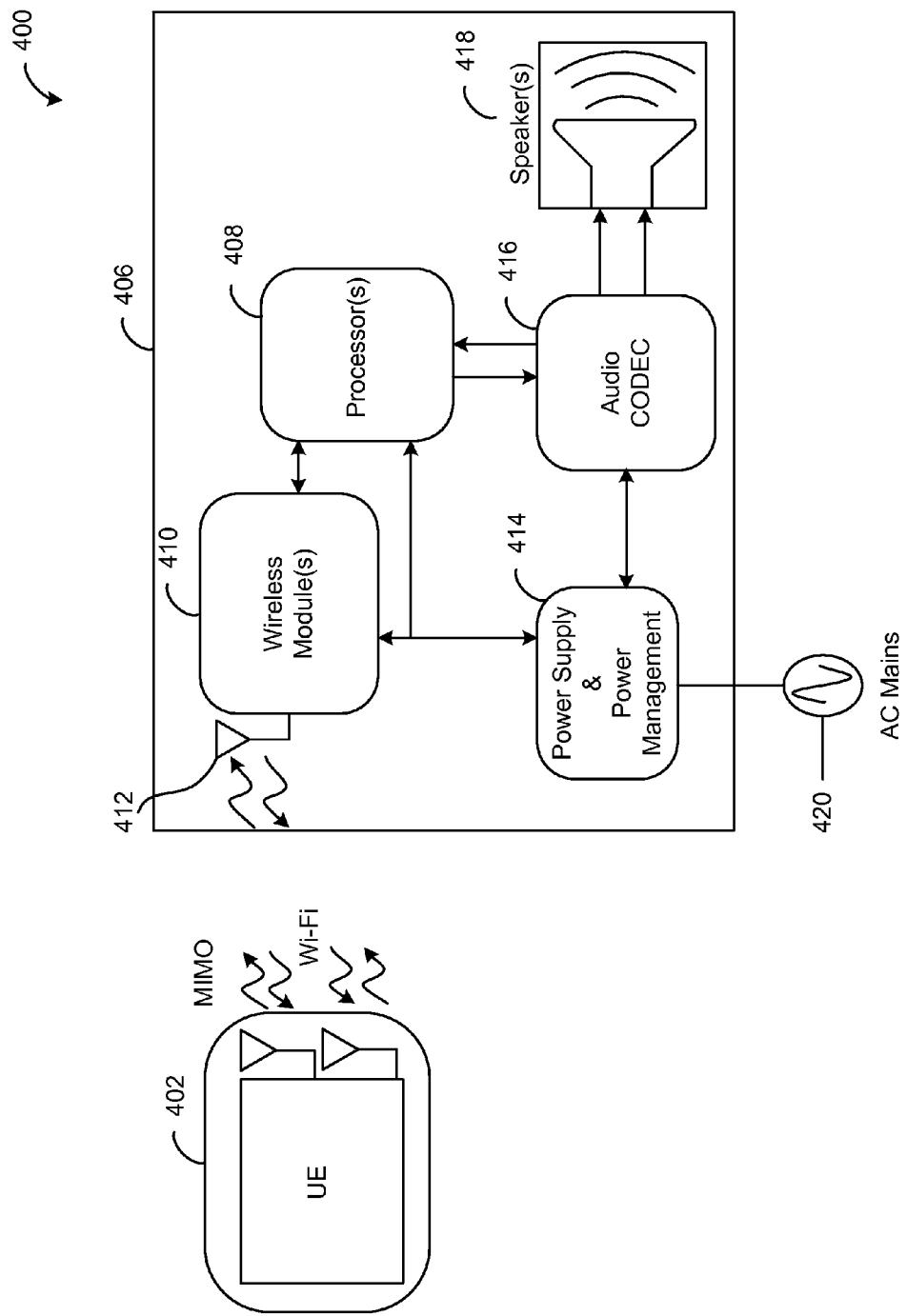
FIG. 4 illustrates system architecture of an example wireless speaker system, according to one or more example embodiments.

FIG. 4 illustrates a speaker system 400, according to one or more example embodiments. Currently there are no mechanisms to detect receiver node power failure when audio stream is transmitted by a host to wireless audio speakers, such as a receiver node that is IEEE1588, 802.1AS compliant. According to this example embodiment, a receiver node's, for example wireless audio speakers, power failure can be detected to stall, pause, or halt audio stream transmission from host side (IEEE1588, 802.1AS compliant). Example embodiments may enable identifying power failure on receiver node side and halting audio stream transmission. Example embodiments also address the issue of identifying abrupt power failures at receiver node, for example wireless audio speakers, and accordingly stalls, pauses, or halts audio stream transmission. Once power is resumed on receiver node, host system resumes the audio stream playback from the point where receiver node had lost its power. Example embodiments therefore enhance user experience by allowing automatic playback from the point where it was stopped.

Sometimes there may be a power failure that can cause receiver node to go offline which in turn won't be known to the host, in such scenario there may be some waste of energy in terms of power, RF power etc. According to one example embodiment, additional packets in IEEE802.1AS may be added, for example an acknowledgement packet from receiver node back to host as part of RAS (Reliability, accessibility, serviceability) packet of IEEE802.1AS. So that every audio stream sent over the WiFi may be acknowledged by the receiver node. This example method may be applicable for "media-independent layer" and "media-dependent layer" specification under IEEE802.1AS. With the addition of "acknowledgement packet" as part of RAS (Reliability, accessibility, serviceability) packet of IEEE802.1AS it may create feedback mechanism in receiver node back to host and enhance the standard for wireless devices, such as wireless audio speakers.

As depicted in the block diagram illustrated in FIG. 4, representing the host system 402 with IEEE1588, 802.1AS complaint and receiver 406 also being complaint with the same. As a first step, host 402 establishes setup with receiver 406 using IEEE1588, 802.1AS standard. According to this example embodiment, receiver 406 may include a Wi-Fi module 410, one or more antennas 412, one or more processor(s) 408, a power supply and management unit 414, one or more audio codecs 416, and one or more output speakers 418. When wireless audio speakers powered through AC mains supply receiving the audio stream wirelessly loses power supply due to unavoidable conditions, host 402 may detect the receiver 406 power failure when it does not receive any acknowledgement packet from receiver node. Host 402 may note the last sent packet timestamp and related audio stream and store the information as depicted and explained in the state diagram shown in FIG. 5, for example. Once receiver 406 resumes power and establishes communication with host 402 using IEEE1588, 802.1AS, host 402 may use the last audio stream sent to resume the transmission. This may help and enhance user experience greatly with no user intervention required in resuming audio playback over Wi-Fi.

Figure 5:
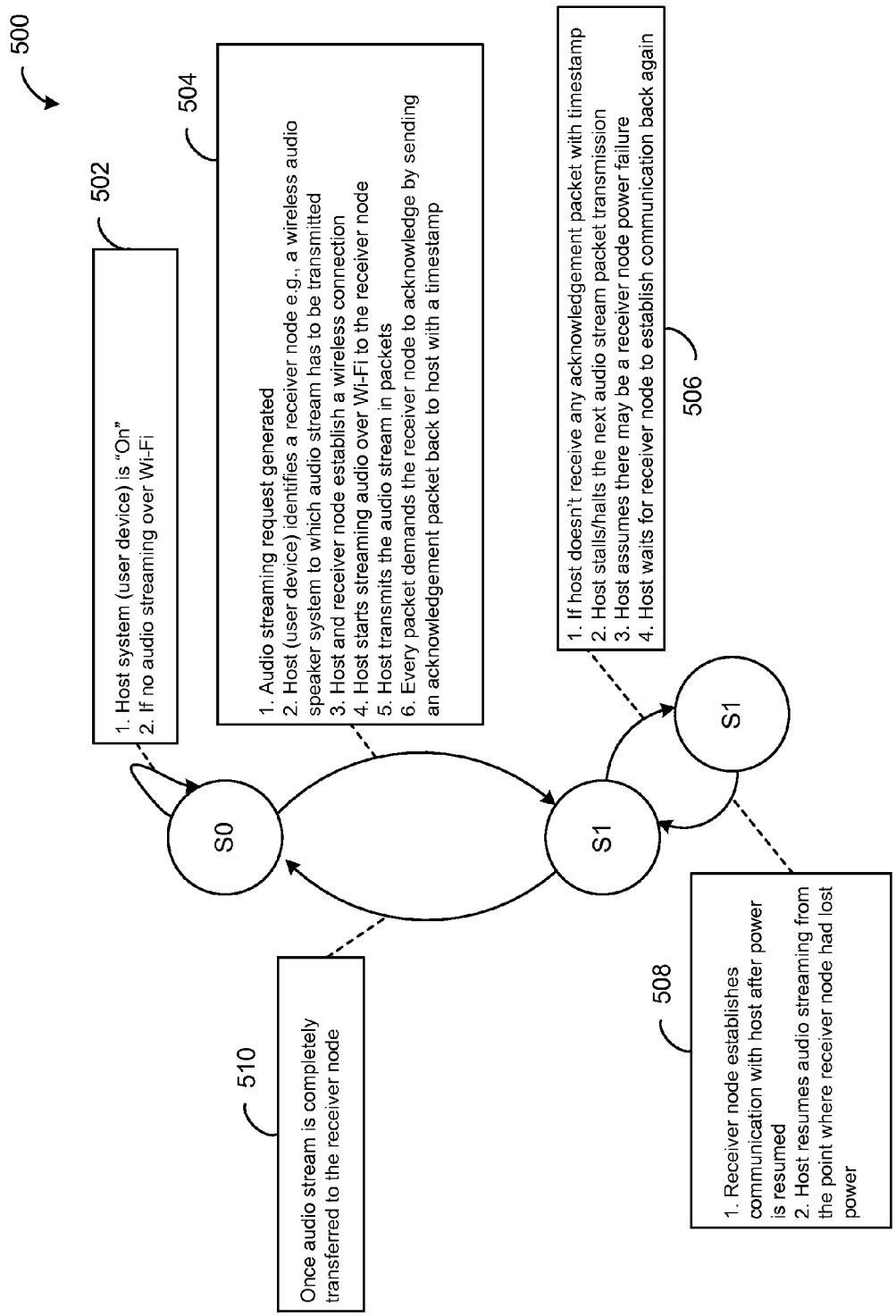
FIG. 5 illustrates an example state methodology for receiver node power failure detection on host side, according to one or more example embodiments.

Turning now to FIG. 5, illustrated is a state diagram 500 for pausing Wi-Fi streaming at the host upon detection of a power failure at a receiver node, according to one or more example embodiments. At block 502, host system may be IEEE1588, 802.1AS compliant and Wi-Fi audio may be streaming on the device. At block 504, an audio streaming request is generated, and the host may identify a receiver node, such as wireless audio speakers, to which the audio stream may be transmitted. At block 506, if the host does not receive any acknowledgement packet with a timestamp, host may stall or pause or halt the next audio stream packet transmission. At block 508, the receiver node establishes communication with the host after power is resumed. At this point, host establishes communication with the receiver node again. Intermediate state S1 may be defined as the state which may identify receiver node power failure. Once host system gets into S1 state it may wait until the receiver node power is resumed.

The terms "communication station", "station", "handheld device", "mobile device", "wireless device" and "user equipment" (UE), as used herein, refer to a wireless communication device such as a cellular telephone, smartphone, tablet, netbook, wireless terminal, laptop computer, a wearable computer device, a femtocell, High Data Rate (HDR) subscriber station, access point, access terminal, or other personal communication system (PCS) device. The device may be either mobile or stationary.

Figure 6:
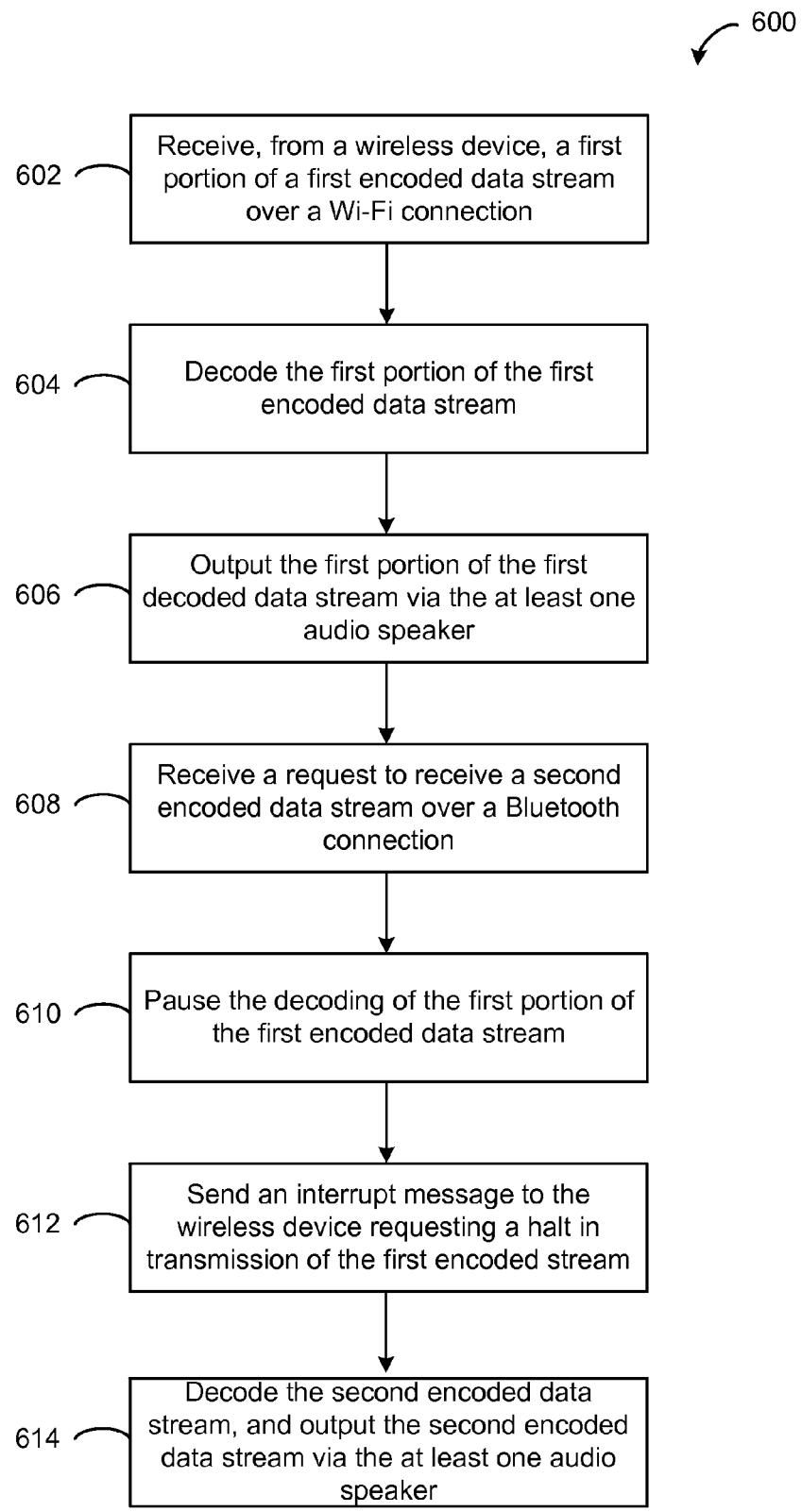
FIG. 6 illustrates operations in an example method for handling Wi-Fi signals on the audio node, according to one or more example embodiments.

FIG. 6 is an example of a flow diagram illustrating operations involved in an example method 600, according to one or more example embodiments. The method 600 may be stored on a non-transitory computer readable medium and may be executed by a processor within the speaker system or receiver node in various embodiments disclosed herein. For example, in operation 602 the method may include receiving, from a wireless device, a first portion of a first encoded data stream over a Wi-Fi connection. In operation 604, the processor may decode the first portion of the first encoded data stream. In operation 606, the processor may output the first portion of the first decoded data stream via the at least one audio speaker. In operation 608, the processor may receive a second encoded data stream over a Bluetooth connection. In operation 610, the processor may pause the decoding of the first portion of the first encoded data stream, and in operation 612, the processor may send an interrupt message to the wireless device requesting a halt in transmission of the first encoded stream, wherein the interrupt message comprises a marker indicating a point in the first encoded data stream where the decoding was paused. In operation 614, the processor may decode the second encoded data stream, and output the second decoded data stream via the at least one audio speaker.

Figure 7:
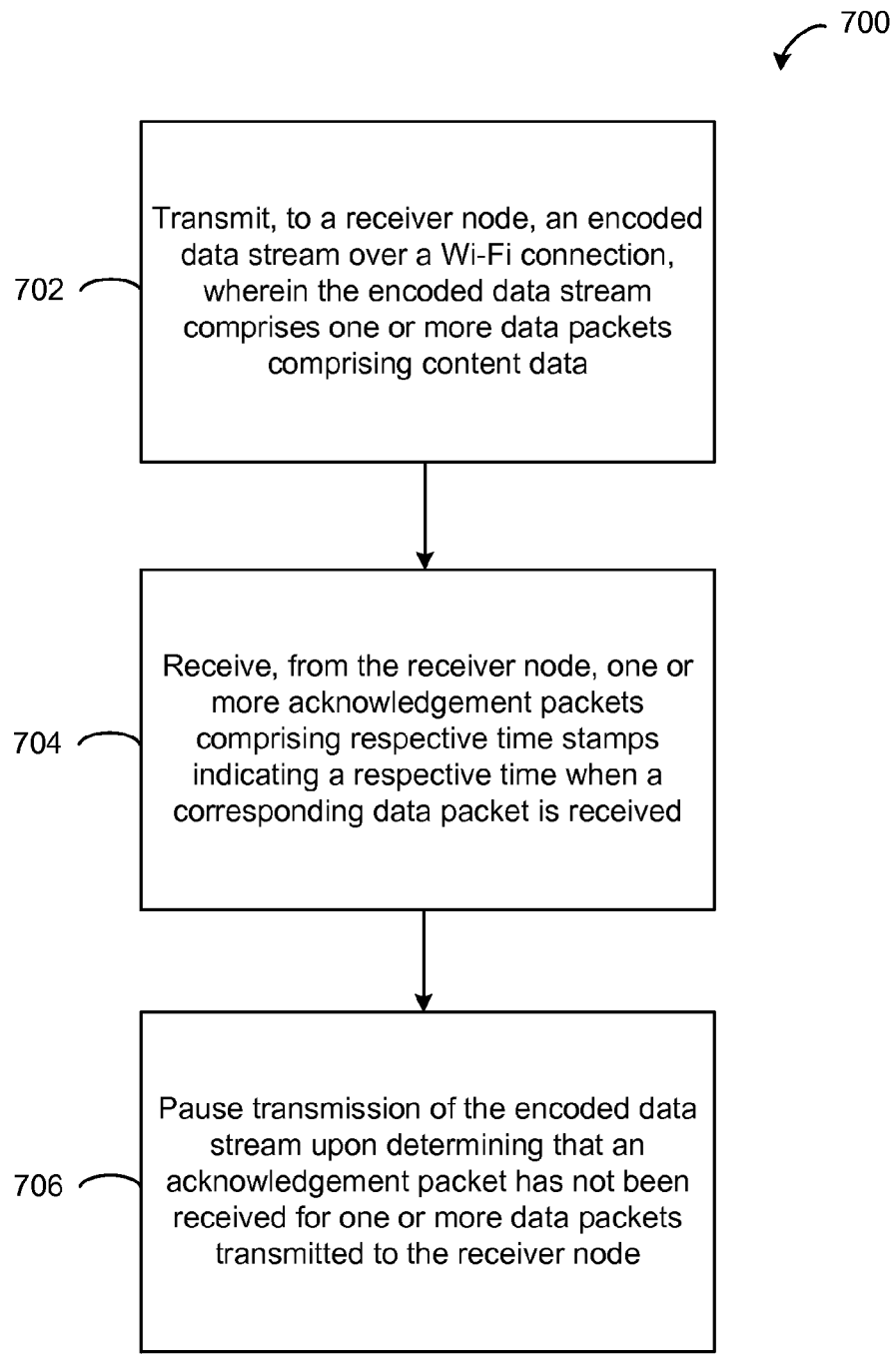
FIG. 7 illustrates operations in an example method for handling Bluetooth signals on the audio node, according to one or more example embodiments.

FIG. 7 is an example of a flow diagram illustrating additional operations involved in the example method 700, according to one or more example embodiments. The method 700 may be stored on a non-transitory computer readable medium and may be executed by a processor within the wireless communication device or host device in various embodiments disclosed herein. The method may include in operation 702, transmitting, to a receiver node, an encoded data stream over a Wi-Fi connection, wherein the encoded data stream comprises one or more data packets comprising content data. In operation 704, the processor may receive, from the receiver node, one or more acknowledgement packets comprising respective time stamps indicating a respective time when a corresponding data packet is received. In operation 706, the processor may pause transmission of the encoded data stream upon determining that an acknowledgement packet has not been received for one or more data packets transmitted to the receiver node.

Figure 8:
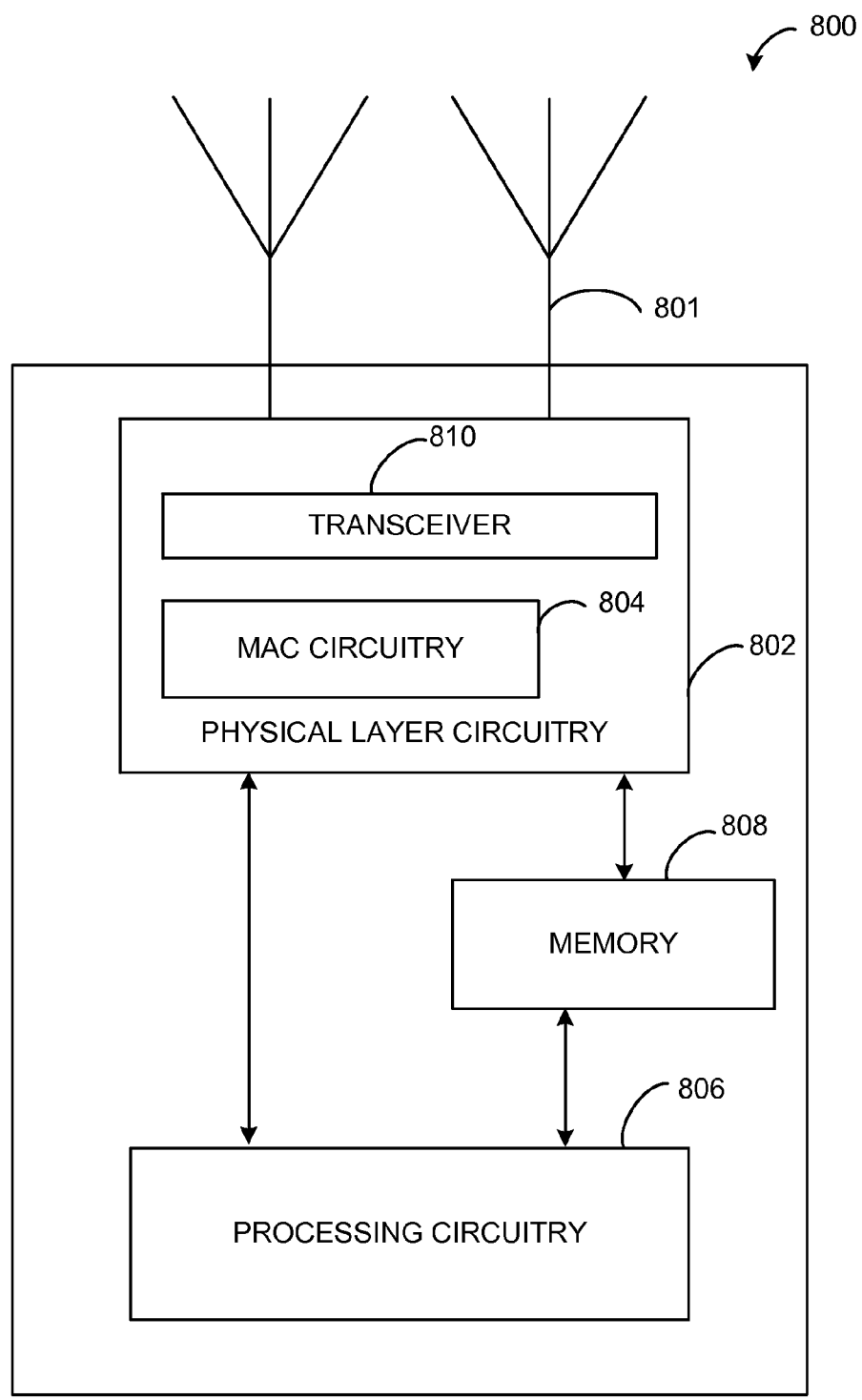
FIG. 8 illustrates an example wireless communication device, according to one or more example embodiments.

Referring to FIG. 8, shown is an example of a wireless communication device 800 (or platform) 102, 104, 402 such as, for example a smart phone, a tablet, a phablet, a personal digital assistant, or other computing device that includes a W-Fi interface (or device), collocated with a Bluetooth interface (or device), according to one or more example embodiments of the present disclosure. The cellular interface (or device) can include processing circuitry capable of supporting cellular communications such as, e.g., LTE, 2G, 3G, 4G, or other cellular communication protocols. The Bluetooth interface (or device) may include processing circuitry for one or more transceiver(s) to support Bluetooth communications. The communication device may also include additional and/or combined interfaces (or devices) including processing circuitry to support other wireless communications such as, e.g., WLAN, WiMAX, global positioning system (GPS), near field communication (NFC), Neighborhood Area Network (NaN), etc. The communication device 800 includes at least one processor circuit, for example, having a processor 806 and a memory 808, both of which are coupled to a local interface.

In various embodiments, the processing circuitry is implemented as at least a portion of a microprocessor. The processing circuitry may be implemented using one or more circuits, one or more microprocessors, application specific integrated circuits, dedicated hardware, digital signal processors, microcomputers, central processing units, field programmable gate arrays, programmable logic devices, state machines, or any combination thereof. In yet other embodiments, the processing circuitry may include one or more software modules executable within one or more processing circuits. The processing circuitry may further include memory configured to store instructions and/or code that causes the processing circuitry to execute data communication functions. In some cases, portions of the cellular interface (or device) 812 and/or wireless interface(s) (or device(s)) 810 may be implemented by processor 806 via local interface 804. The local interface 804 may comprise, for example, a data bus with an accompanying address/control bus or other bus structure as can be appreciated.

Stored in the memory 808 are both data and several components that are executable by the processor 806 and/or by processing circuitry of the cellular interface (or device) 812 and/or wireless interface(s) (or device(s)) 810. In addition, an operating system may be stored in the memory 808 and executable by the processor 806. In some embodiments, the cellular interface (or device) 812 and/or wireless interface(s). In some cases, the processor 806 and memory 808 may be integrated as a system-on-a-chip.

It is understood that there may be other applications that are stored in the memory and are executable by the processor 806, the cellular interface (or device) 812 and/or wireless interface(s) (or device(s)) 810 as can be appreciated. A number of software components may be stored in the memory and executable by the processor 806, the cellular interface (or device) 812 and/or wireless interface(s) (or device(s)) 810. In this respect, the term "executable" means a program file that is in a form that can ultimately be run by the processor 806, the cellular interface (or device) 812 and/or wireless interface(s) (or device(s)) 810. Examples of executable programs may be, for example, a compiled program that can be translated into machine code in a format that can be loaded into a random access portion of the memory 808 and run by the processor 806, source code that may be expressed in proper format such as object code that is capable of being loaded into a random access portion of the memory 808 and executed by the processor 806, or source code that may be interpreted by another executable program to generate instructions in a random access portion of the memory 808 to be executed by the processor 806, etc. An executable program may be stored in any portion or component of the memory including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory is defined herein as including both volatile and nonvolatile memory and data storage components. Volatile components are those that do not retain data values upon loss of power. Nonvolatile components are those that retain data upon a loss of power. Thus, the memory 808 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 806 may represent multiple processors 806 and the memory 808 may represent multiple memories 808 that operate in parallel processing circuits, respectively. In such a case, the local interface 804 may be an appropriate network that facilitates communication between any two of the multiple processors 806, between any processor 806 and any of the memories 808, or between any two of the memories 808, etc. The local interface 804 may comprise additional systems designed to coordinate this communication, including, for example, performing load balancing. The processor 806 may be of electrical or of some other available construction.

Although the scheduling manager, and other various systems described herein may be embodied in software or code executed by general purpose hardware, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

Based on the foregoing it should be apparent that the example embodiments of this disclosure provide a method, apparatus and computer program(s) to provide enhanced in-device coexistence for a user device that operates with a cellular network, such as the LTE network.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

Although the flowchart of FIG. 5, 6 shows a specific order of execution, it is understood that the order of execution may differ from that which is depicted. For example, the order of execution of two or more blocks may be scrambled relative to the order shown. Also, two or more blocks shown in succession in FIG. 5, 6 may be executed concurrently or with partial concurrence. Further, in some embodiments, one or more of the blocks shown in FIG. 5, 6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that comprises software or code can be embodied in any non-transitory computer-readable medium for use by or in connection with an instruction execution system such as, for example, a processor 806 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

EXAMPLE EMBODIMENTS

One example embodiment is a wireless communication device including at least one memory including computer-executable instructions stored thereon, and one or more processors to execute the computer-executable instructions to transmit, to a receiver node, an encoded data stream over a Wi-Fi connection, wherein the encoded data stream includes one or more data packets including content data, receive, from the receiver node, one or more acknowledgement packets including respective time stamps indicating a respective time when a corresponding data packet is received, and pause transmission of the encoded data stream upon determining that an acknowledgement packet has not been received for one or more data packets transmitted to the receiver node. The processor may further be configured to execute the computer-executable instructions to generate a marker indicating a point in the encoded data stream where the transmission was paused. The processor may also be configured to execute the computer-executable instructions to re-establish the Wi-Fi connection with the receiver node, and resume transmission of the encoded data stream from the point where the transmission was paused. The encoded data stream may include audio data or video data. The acknowledge packet may be a reliability, accessibility, serviceability (RAS) packet including the timestamp.

Another example embodiment is a non-transitory computer readable medium including instructions stored thereon, which when executed by one or more processor(s) of a wireless device, cause the wireless device to perform the operations of causing to transmit an encoded data stream over a Wi-Fi connection, wherein the encoded data stream includes one or more data packets including content data identifying an acknowledgement packet including a time stamp indicating a time when a data packet is received, and causing to pause transmission of the encoded data stream upon determining that an acknowledgement packet has not been received for one or more data packets transmitted to the receiver node. The medium may also include instructions for generating a marker indicating a point in the encoded data stream where the transmission was paused. The medium may also include instructions for resuming transmission of the encoded data stream from the point where the transmission was paused.

Another example embodiment is a speaker system including at least one audio speaker, at least one memory including computer-executable instructions stored thereon, and one or more processing elements to execute the computer-executable instructions to receive, from a wireless device, a first portion of a first encoded data stream over a Wi-Fi connection, decode the first portion of the first encoded data stream, output the first portion of the first decoded data stream via the at least one audio speaker, receive a second encoded data stream over a Bluetooth connection, pause the decoding of the first portion of the first encoded data stream, send an interrupt message to the wireless device requesting a halt in transmission of the first encoded stream, wherein the interrupt message includes a marker indicating a point in the first encoded data stream where the decoding was paused, decode the second encoded data stream, and output the second decoded data stream via the at least one audio speaker. The processor may also be configured to execute the computer-executable instructions to send, to the wireless device, a message requesting transfer of a second portion of the first encoded data stream starting from the point indicated by the marker where the decoding was paused, receive, from the wireless device, the second portion of the first encoded data stream over the Wi-Fi connection, decode the second portion of the first encoded data stream, and output the second portion of the first decoded data stream via the at least one audio speaker. The first encoded data stream and the second encoded data stream include a plurality of data packets. The interrupt message is a reliability, accessibility, serviceability (RAS) packet including the marker. The processor may further be configured to execute the computer-executable instructions to generate a RAS packet for one or more data packets received by the speaker system, and send the RAS packet to the wireless device. The first encoded data stream or the second encoded data stream may includes audio data or video data.

Another example embodiment is a non-transitory computer readable medium including instructions stored thereon, which when executed by one or more processor(s) of a speaker system, cause the speaker system to perform the operations of identifying, from a wireless device, a first portion of a first encoded data stream over a Wi-Fi connection, decoding the first portion of the first encoded data stream, causing to output the first portion of the first decoded data stream via one or more output speakers, identifying a request to receive a second encoded data stream over a Bluetooth connection, pausing decoding of the first portion of the first encoded data stream, causing to send an interrupt message to the wireless device requesting a halt in transmission of the first encoded stream, wherein the interrupt message includes a marker indicating a point in the first encoded data stream where the decoding was paused, encoding the second encoded data stream, and causing to output the second decoded data stream via the one or more output speakers. The medium may also include instructions for causing to send, to the wireless device, a message requesting transfer of a second portion of the first encoded data stream starting from the point where the decoding was paused, identifying, from the wireless device, the second portion of the first encoded data stream over the Wi-Fi connection, decoding the second portion of the first encoded data stream, and causing to output the second portion of the first decoded data stream via the one or more output speakers. The first encoded data stream and the second encoded data stream include a plurality of data packets. The interrupt message may include a reliability, accessibility, serviceability (RAS) packet including the marker. The medium may also include instructions for generating a RAS packet for one or more data packets received, and causing to send the RAS packet to the wireless device. The first encoded data stream or the second encoded data stream may include audio data or video data.

Some examples in the Detailed Description may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples in the detailed description may be described using the expression "coupled", "connected", or "capable of being coupled" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms used in the description and claims are not limited to their dictionary meanings, but, are merely used to enable a clear and consistent understanding of the disclosure. Accordingly, it should be apparent to those skilled in the art that the following description of embodiments of the present disclosure is provided for illustration purpose only and not for the purpose of limiting the disclosure as defined by the appended claims and their equivalents. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A wireless communication device comprising:
   at least one memory comprising computer-executable instructions stored thereon; and
   one or more processors to execute the computer-executable instructions to:
      transmit, to a receiver node, an encoded data stream over a wireless connection, wherein the encoded data stream comprises a first data packet comprising first content data;
      receive, from the receiver node, a first acknowledgement packet comprising a first time stamp indicating a first time when the first data packet is received;
      transmit, to the receiver node, a second data packet comprising second content data;
      determine that a second acknowledgement packet has not been received for the second data packet transmitted to the receiver node after a predetermined duration;
      determine that the receiver node is unavailable;
      pause transmission of the encoded data stream based at least in part on the determination that the receiver node is unavailable;
      generate a marker indicating a point in the encoded data stream where the transmission was paused;
      receive, from the receiver node, the second acknowledgement packet comprising a second time stamp indicating a second time when the second data packet is received;
      re-establish the wireless connection with the receiver node; and
      transmit, to the receiver node, a third data packet comprising third content data wherein the third content data includes the encoded data stream at the marker indicating the point where the transmission was paused.

2. The device of claim 1, wherein the encoded data stream comprises audio data.

3. The device of claim 1, wherein the first acknowledge packet is a reliability, accessibility, serviceability (RAS) packet comprising the first time stamp.

4. A non-transitory computer readable medium including instructions stored thereon, which when executed by one or more processor(s) of a wireless device, cause the wireless device to perform operations of:
   causing to transmit an encoded data stream over a wireless connection, wherein the encoded data stream comprises a first data packet comprising first content data;
   identifying a first acknowledgement packet comprising a first time stamp indicating a first time when the first data packet is received by a receiver node;
   causing to transmit the encoded data stream over the wireless connection, wherein the encoded data stream further comprises a second data packet comprising second content data;
   determining that a second acknowledgement packet has not been received for the second data packet transmitted to the receiver node after a predetermined duration;
   determining that the receiver node is unavailable;
   causing to pause transmission of the encoded data stream based at least in part on the determination that the receiver node is unavailable;
   causing to generate a marker indicating a point in the encoded data stream where the transmission was paused;
   identifying a second acknowledgement packet comprising a second time stamp indicating a second time when the second data packet is received;
   re-establish the wireless connection with the receiver node; and
   causing to transmit the encoded data stream over the wireless connection, wherein the encoded data stream further comprises a third data packet comprising third content data, wherein the third content data includes the encoded data stream at the marker indicating the point where the transmission was paused.

5. The medium of claim 4, further comprising operations of:
   generating a marker indicating a point in the encoded data stream where the transmission was paused.

6. The medium of claim 4, further comprising operations of:
   resuming transmission of the encoded data stream from the point where the transmission was paused.

7. A speaker system comprising:
   at least one memory comprising computer-executable instructions stored thereon; and
   one or more processing elements to execute the computer-executable instructions to:
      receive, from a wireless device, a first portion of a first encoded data stream over a Wi-Fi connection;
      transmit, to the wireless device, a first acknowledgement packet comprising a first time stamp indicating a first time when the first portion of a first encoded data stream is received;
      decode the first portion of the first encoded data stream;
      receive, from a second device, a second encoded data stream over a Bluetooth connection;
      transmit, to the second device, a second acknowledgement packet comprising a second time stamp indicating a second time when the second encoded data stream is received;
      pause the decoding of the first portion of the first encoded data stream;
      send a message to the wireless device that the speaker system is unavailable;
      send an interrupt message to the wireless device requesting a halt in transmission of the first encoded stream, wherein the interrupt message comprises a marker indicating a point in the first encoded data stream where the decoding was paused; and
      decode the second encoded data stream.

8. The system of claim 7, wherein the one or more processing elements is further configured to execute the computer-executable instructions to:

send, to the wireless device, a message requesting transfer of a second portion of the first encoded data stream starting from the point indicated by the marker where the decoding was paused;

receive, from the wireless device, the second portion of the first encoded data stream over the Wi-Fi connection;

decode the second portion of the first encoded data stream; and output the second portion of the first decoded data stream via the at least one audio speaker.

9. The system of claim 7, wherein the first encoded data stream and the second encoded data stream comprise a plurality of data packets.

10. The system of claim 7, wherein the interrupt message is a reliability, accessibility, serviceability (RAS) packet comprising the marker.

11. The system of claim 10, wherein the one or more processing elements is further configured to execute the computer-executable instructions to:

generate a RAS packet for one or more data packets received by the speaker system; and send the RAS packet to the wireless device.

12. The system of claim 7, wherein the one or more processing elements is further configured to execute the computer-executable instructions to:

output the first portion of the first decoded data stream via at least one audio speaker; and output the second decoded data stream via the at least one audio speaker.

13. A non-transitory computer readable medium including instructions stored thereon, which when executed by one or more processor(s) of a speaker system, cause the speaker system to perform operations of:

identifying, from a wireless device, a first portion of a first encoded data stream over a Wi-Fi connection;

sending, to the wireless device, a first acknowledgement packet comprising a first time stamp indicating a first time when the first portion of the first encoded data stream is identified;

decoding the first portion of the first encoded data stream;

causing to output the first portion of the first decoded data stream via one or more output speakers;

identifying, from a second device, a request to receive a second encoded data stream over a Bluetooth connection;

sending, to the second device, a second acknowledgement packet comprising a second time stamp indicating a second time when the second encoded data stream is identified;

pausing decoding of the first portion of the first encoded data stream;

sending a message to the wireless device that the speaker system is unavailable;

causing to send an interrupt message to the wireless device requesting a halt in transmission of the first encoded stream, wherein the interrupt message comprises a marker indicating a point in the first encoded data stream where the decoding was paused;

decoding the second encoded data stream; and causing to output the second decoded data stream via the one or more output speakers.

14. The medium of claim 13, further comprising operations of:

causing to send, to the wireless device, a message requesting transfer of a second portion of the first encoded data stream starting from the point where the decoding was paused;

identifying, from the wireless device, the second portion of the first encoded data stream over the Wi-Fi connection;

decoding the second portion of the first encoded data stream; and causing to output the second portion of the first decoded data stream via the one or more output speakers.

15. The medium of claim 13, wherein the first encoded data stream and the second encoded data stream comprise a plurality of data packets.

16. The medium of claim 13, wherein the interrupt message includes a reliability, accessibility, serviceability (RAS) packet comprising the marker.

17. The medium of claim 15, further comprising operations of:

generating a RAS packet for one or more data packets received; and causing to send the RAS packet to the wireless device.

18. The medium of claim 13, wherein the first encoded data stream or the second encoded data stream comprises audio data.

* * * * *